(12) United States Patent
Rudolf et al.

(10) Patent No.: US 6,216,839 B1
(45) Date of Patent: Apr. 17, 2001

(54) FRICTION CLUTCH WITH NICKEL-CHROMIUM ALLOY SPRING ELEMENTS

(75) Inventors: Thomas Rudolf, Dettelbach; Klaus Betten, Sömmersdorf; Horst Friedrich, Aidhausen/Happertshausen; Jürgen Loibersbeck, Grafenrheinfeld, all of (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/349,595

(22) Filed: Jul. 9, 1999

(30) Foreign Application Priority Data

Jul. 9, 1998 (DE) ............................................. 198 30 660

(51) Int. Cl.⁷ ................................................... F16D 13/71
(52) U.S. Cl. .................................. 192/70.27; 192/89.22; 192/89.23
(58) Field of Search ............................. 192/70.27, 89.22, 192/89.23, 89.24, 89.25; 267/161

(56) References Cited

U.S. PATENT DOCUMENTS

| 2,566,374 | * | 9/1951 | Reed .............................. 192/70.27 X |
| 3,730,151 | | 5/1973 | Smith et al. . |
| 4,225,025 | * | 9/1980 | Crawford ............................ 192/70.2 |
| 4,713,977 | * | 12/1987 | Koster et al. .......................... 74/191 |

FOREIGN PATENT DOCUMENTS

| 2537544 | * | 3/1976 | (DE) ..................................... 267/161 |
| 35 42 847 | | 1/1995 | (DE) . |
| 235 075 | | 9/1987 | (EP) . |
| 2142158 | * | 1/1973 | (FR) .................................. 192/89.25 |
| 1368245 | * | 9/1974 | (GB) ................................. 192/89.23 |
| 61 72 951 | | 6/1994 | (JP) . |

OTHER PUBLICATIONS

"Das Mubea Teller– Federn– Handbuch", 7th Ed.; title page + page describing chemical composition of Mubea disk springs, Dated Aug. 1981.

"Hardening Shop Bochum", attachment to "Antriebstechnik" Dec. 1989, vol. 23, 4 pages.

"Handbuch der Fertigungstechnik" vol. 4/2 Heat Treatments, published by Prof. Dr.–Ing. Dr. h.c. Dr.–Ing. E.h. Günter Spur, Carl Hanser Verlag München Wien, 1987, title page, pp. 652–656, 661, 789 and 887–894.

* cited by examiner

Primary Examiner—Richard M. Lorence
(74) Attorney, Agent, or Firm—Cohen, Pontani, Lieberman & Pavane

(57) ABSTRACT

A friction coupling for use in particular in the drive train of a motor vehicle includes a clutch casing, a pressure plate which is guided in a rotationally fixed manner with respect to the clutch casing, at least one clutch disk and a spring device containing about 40–60% nickel. A method for coating a nickel-base material, in particular the above mentioned spring element for friction clutches, wherein at least part of the surface of the spring device contains boride, and also a method for producing such a spring device which includes a heat treatment are also disclosed.

20 Claims, 2 Drawing Sheets

# FRICTION CLUTCH WITH NICKEL-CHROMIUM ALLOY SPRING ELEMENTS

BACKGROUND OF THE INVENTION

1. Field of the Invention

The present invention relates to friction clutches, in particular for motor vehicles with internal combustion engines, including a clutch casing, a pressure plate which is guided in a rotationally fixed manner with respect to the clutch casing, at least one clutch disk and a spring device comprising from about 40 to 65% nickel.

2. Background of the Invention

Internal combustion engines provide a torque which can be used for drive purposes only within the speed range between idling speed and nominal speed. Motor vehicles therefore generally require a transmission and a device for separating the engine from the drive train. In the case of manual transmissions, a friction clutch is typically used for this purpose, and this clutch also allows an initially stationary vehicle to be driven off. Friction clutches of the prior art comprise a clutch casing, in which a pressure plate is guided in a rotationally fixed manner and is acted on by spring elements, and at least one clutch disk which in the at-rest state, which in this case is the engaged state, is clamped between the pressure plate and the torque input part as a result of the spring action. The clutch disk, which is connected to the output part, e.g. the transmission shaft, is thus entrained with the pressure plate and the input part as a result of the friction and therefore executes essentially the same rotational movement as the input part and output part. The force generated by the spring devices therefore must not fall below a minimum level in operation, in order for the engine torque to be reliably transmitted. In addition, the elasticity of the spring material is important, since the friction clutch is disengaged by elastic deformation of the spring element or elements. Since the disengagement mechanism is subject to friction, it is often useful for it to be at least partly coated with low-friction, hard materials. The friction clutches of the prior art usually have spring devices made from heat-treated steel, such as for example 50CrV4. The coating of the spring devices with hard material, such as for example chromium, is known, for example, from P 35 42 847.3. However, it has emerged that the spring devices, particularly when used in high-power engines, are heated to temperatures at which these conventional spring device materials may lose their elastic properties and their strength in the high-temperature phase, and under certain circumstances this loss may even be irreversible. Such reversible or irreversible setting losses of the spring elements may reduce the pressure force which they exert. It is therefore necessary to use relatively strong spring devices which ensure high torque transmission even under high thermal loads. A disadvantage, however, is that they also increase the inertial mass.

SUMMARY OF THE INVENTION

An object of the invention is therefore to present a friction clutch in which the spring devices are largely insensitive to heat, and to present a method for producing such spring devices. A further object of the invention is to describe a suitable coating material for the spring material and to present a method for coating the spring material with the coating material. According to the invention, these and other objects are achieved by means of a friction clutch which is designed in particular for use in the drive train of a motor vehicle and which comprises a clutch casing, a pressure plate which is guided in a rotationally fixed manner with respect to the clutch casing, at least one clutch disk and a spring device, and in which clutch at least part of the spring device comprises 40–60% nickel. A nickel content of 50–55%, as specified in a preferred embodiment, has proven particularly advantageous. A further advantageous configuration consists in providing 10–30%, or preferably 15–25%, chromium in the spring device. A preferred embodiment furthermore comprises at least one of the elements iron, niobium and molybdenum. Suitably, the iron content may be 10–30%, the niobium content 2–8% and the molybdenum content 1–6%. Particularly if it is intended for the spring device to be heat treated, the spring device should additionally contain titanium and aluminum, suitably at levels of 0.5–5% and 0.1–5%, respectively.

In the following, suitable spring constructions for spring elements made from the nickel-chromium alloy are described. If there is only a small amount of space available, it may be expedient to design a spring element as a coil spring. This may be advantageous as a of the small amount of space which coil springs require in particular perpendicular to their direction of action. If, on the other hand, the amount of space available is limited in the direction of action, it is recommended for the spring device to be designed as a disk spring. Disk springs require only a small amount of space in their direction of action. Furthermore, their simple form makes their surface easier to treat, for example to produce a surface layer by fusion or electroplating. An advantageous configuration is to use a diaphragm spring as the spring element made from nickel-chromium alloy. Diaphragm springs are disk springs with integrated actuation levers, which have the further advantage that in this case it is possible to dispense with manufacture and assembly of the corresponding actuation devices.

Particularly in the case of the integrated actuation levers of the diaphragm spring, but also in the case of other spring devices, friction may occur when the clutch is engaged and disengaged. It is therefore often desirable for the spring elements to have low-friction, wear-resistant surfaces. One embodiment therefore provides for at least part of the spring-device surface to contain boride. In a preferred configuration, at least part of the spring-device surface consists of boride. Depending on the particular application, boride can be applied to the surface in the molten state, such as for example by means of powder-coating processes, or by electroplating, the former option transmitting higher temperatures to the spring element. This may be advantageous in the case of hot age-hardening nickel-chromium alloys. In other cases, for example if the heating is undesirable, the electroplating option is advantageous. Particular preference is given to a method for coating a nickel-chromium material, which is to be used in particular for coating a nickel-base spring element for friction clutches, and in which method the surface of the component made from nickel-chromium alloy is covered with boron powder and is then heated at 800–1000° C. for 3–7 hours, with the component situated in an inert-gas atmosphere.

Furthermore, in connection with the present invention, a method is proposed for producing a spring device from nickel-chromium alloy in which the spring device is preferably to be used in friction clutches for motor vehicles and in which the method includes a heat treatment of the nickel-chromium alloy. Due to the special thermal properties of nickel-chromium alloys, it may be expedient for the heat treatment to include the shaping of the spring device. An advantageous embodiment of the method according to the present invention provides for the spring device to be clamped into a fixture during the heat treatment, so that it is given the desired shape. In this case, it may be expedient to carry out the heat treatment of the method under an inert-gas atmosphere for at least part of the time. In this case, it may be advantageous to use nitrogen as the inert gas. Furthermore, the method may comprise at least one cooling operation as part of the heat treatment, which cooling operation is expediently carried out using a gaseous coolant. In this case, it may be advantageous to use nitrogen as this coolant. A preferred method comprises the following steps:

a) clamping the spring blank into the fixture
b) heating the clamped spring blank at 900–1000° C. for 0.5–1.5 hours
c) cooling the spring blank to room temperature in a nitrogen atmosphere
d) heating the spring blank at 700–750° C. for 5–11 hours
e) cooling the spring blank to 600–650° C. with a cooling rate of approximately 50° C. per hour, and holding the temperature for 5–11 hours
f) cooling the spring blank to room temperature in a nitrogen atmosphere.

The friction clutch of the present invention with the spring device containing 40–60% nickel has the particular advantage over friction clutches of the prior art that in operation the spring device suffers no or only insignificant setting losses. The strength and elasticity properties of such nickel-chromium alloys may be comparable to those of steel, but the nickel-chromium alloys suffer considerably less reversible loss of strength, and no irreversible loss of strength, under the action of heat. Therefore, the spring elements only set slightly in operation and always return to their initial form. The setting losses of the spring elements which have to be taken into account when adjusting the clutch are therefore considerably less than with clutches of the prior art. Therefore, tolerances can be tighter and the clutch will operate with greater accuracy throughout its entire service life and at all operating temperatures. Since there is no risk of loss of pressure force, the spring device made from the nickel-chromium alloy can be adapted to requirements with very great accuracy. The friction clutch can thus be of very compact and lightweight structure, making it possible to reduce inertia losses in the drive train. An increased service life of the nickel-chromium alloy spring elements can also be noted. The friction clutch of the present invention therefore also makes it possible to save on repair costs.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Preferred embodiments of the present invention are described below with reference to the drawings, in which.

DETAILED DESCRIPTION OF THE PRESENTLY PREFERRED EMBODIMENTS

Figure 1:
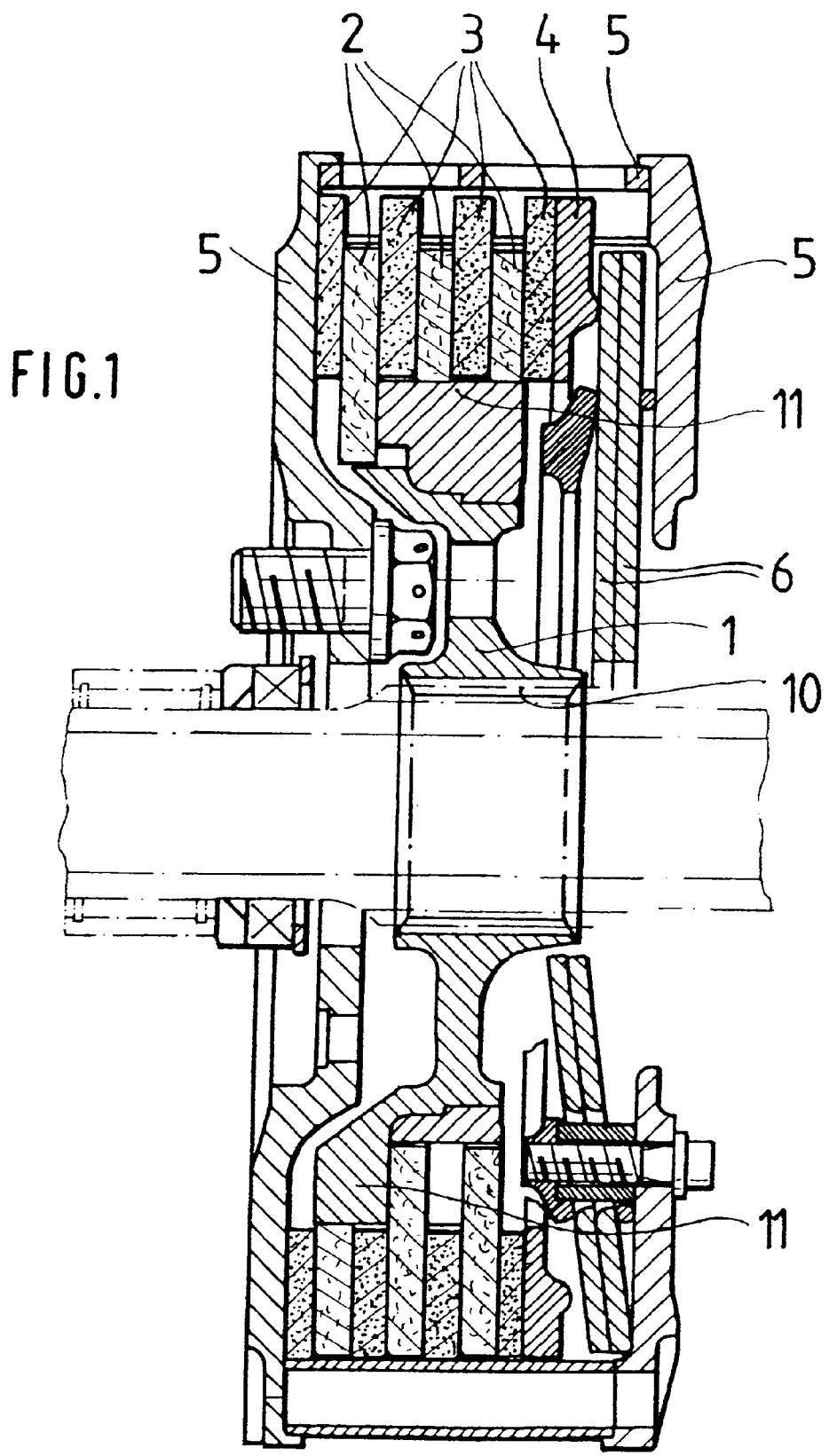
FIG. 1 shows a longitudinal section through a multidisk clutch with a diaphragm spring, the top half of the figure showing the engaged state and the bottom half showing the disengaged state.

The multidisk clutch shown in FIG. 1 has a hub 1 with internal toothing 10 in order for it to be mounted in a rotationally fixed, axially displaceable manner on a transmission shaft. Via further external toothing 11, the friction linings 2 are connected to the hub 10 in a rotationally fixed manner. A further set of friction linings 3 is connected, in a rotationally fixed manner, to the three-part clutch casing 5. As can be seen from the drawing, the friction linings 2 and the friction linings 3 are arranged alternately in the axial direction, so that when the casing 5 rotates with respect to the hub 1 the friction linings 2 and 3 are able to transmit a dragging moment. The friction between the linings 2 and 3 is determined, inter alia, by the pressure force of the spring device 6, which in this case is designed as a diaphragm spring and acts on the pressure plate 4, which is guided in a rotationally fixed manner in the clutch casing 5. The spring device 6 is in this case supported in the clutch casing 5 in such a way that the load on the pressure plate 4 is relieved when the radially inner diaphragm-spring tips are pressed axially toward the hub 1. On the other hand, if the diaphragm-spring tips are not pressed, the preloaded spring device 6 presses the friction linings 2 and 3 together by means of the pressure plate 4, so that clutch casing 5 and hub 1 are connected to one another in a rotationally fixed manner by means of a frictional connection between the friction linings 2 and 3. The elasticity and strength of the material of the spring device 6 are therefore among the defining factors for the torque which the clutch is able to transmit. Furthermore, the preloading of the spring device 6 determines the force which is exerted on the pressure plate 4. Therefore, the spring device 6 of the present invention, which in this case is designed as a diaphragm spring, is made from nickel-chromium alloy. This material has an elasticity and strength which are comparable to those of spring steel but undergoes much less plastic deformation at high temperatures. In contrast to the steel spring devices of the prior art, the preloading of the spring device 6 made from nickel-chromium alloy remains substantially constant. The friction clutch can thus be manufactured with greater accuracy and with tighter tolerances. Since the strength of the spring device 6 changes only insignificantly with temperature, the pressure and lateral forces can be accurately adapted to the intended purpose.

The disengagement operation may produce friction at the contact points between the spring device 6 and the pressure plate 4 or the clutch casing 5. Friction may also be generated between the diaphragm-spring tips and the disengagement device which typically acts on these tips. In addition to the friction losses, this also has the effect of producing wear, and consequently a hard and smooth surface is desired. The preferred embodiment of the present invention therefore has a spring device whose surface comprises boride. The boride surface is preferably produced by fusing boron powder onto the surface of the spring element. Particular preference is in this case given to a method in which the nickel-chromium alloy spring element is covered with boron powder and is then heated at 800–1000° C. for 3–7 hours, with an inert-gas atmosphere preventing undesirable reactions on the surface of the spring element. It is also possible, of course, to use other processes, such as for example electroplating or other plating processes.

The spring device made from the nickel-chromium alloy is preferably produced using the above method.

Figure 2A:
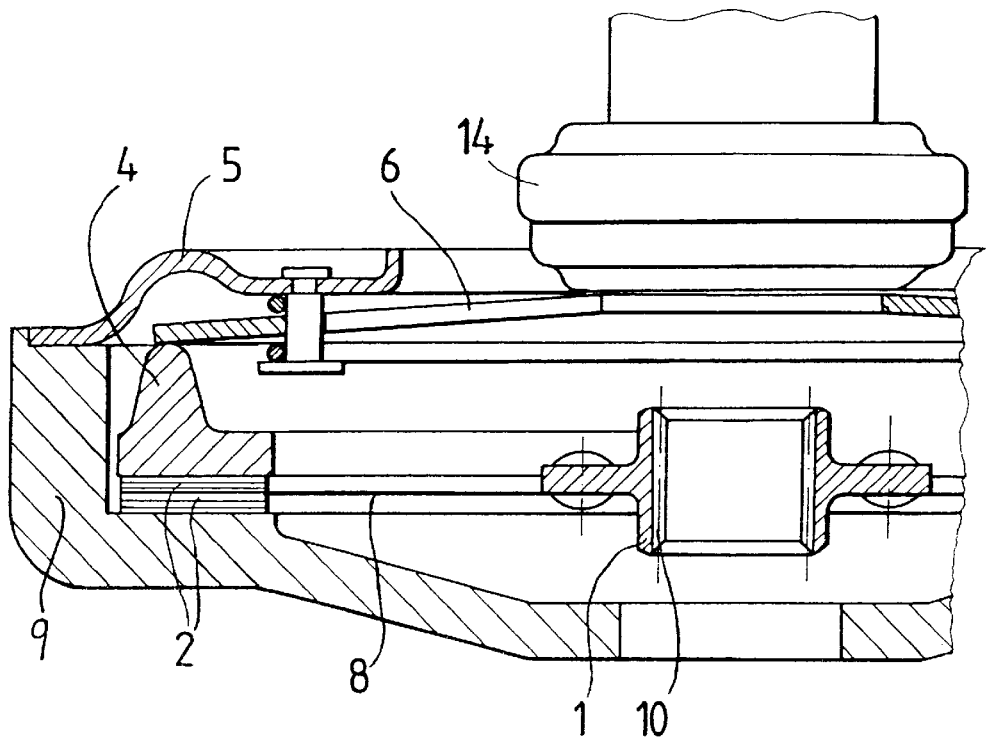
FIG. 2A shows a longitudinal section through a single-disk clutch with a diaphragm spring.
Figure 2B:
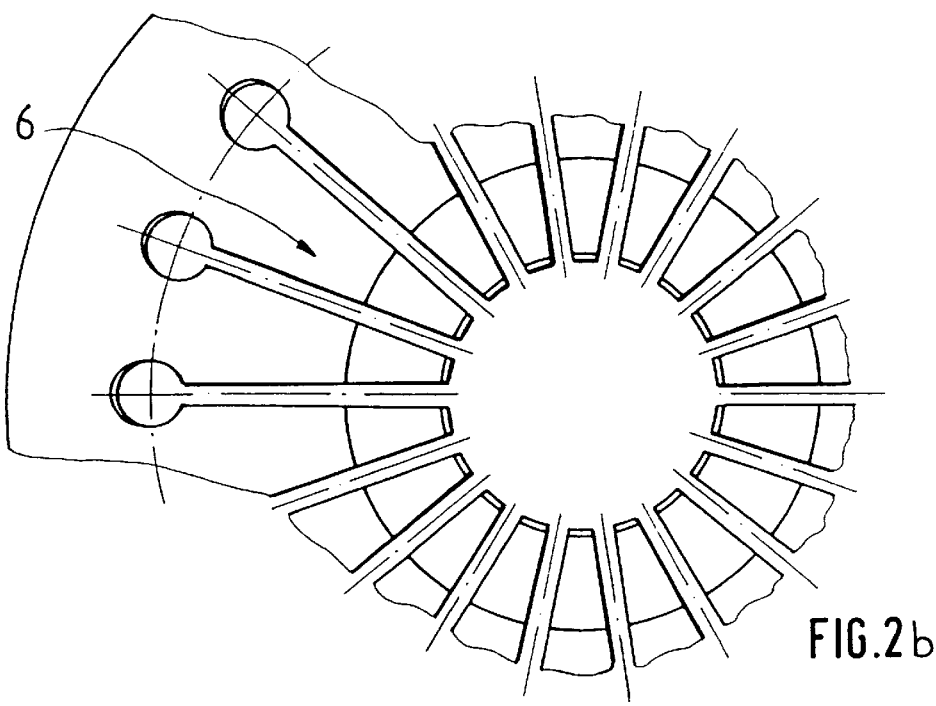
FIG. 2B shows a partial plan view of the spring device of the clutch of FIG. 2A.

FIGS. 2A and 2B show another embodiment of a friction clutch with a spring device made from nickel-base material, the spring device in this case too being designed as a diaphragm spring. This so-called single-disk clutch comprises a flywheel 9, which is connected to the clutch casing 5 in a rotationally fixed manner by means of bolts(not shown), as well as a pressure plate 4, which is connected in a rotationally fixed manner either to the flywheel 9 or to the clutch casing 5. A clutch disk 8 with friction linings 2 is located between the flywheel 9 and the pressure plate 4, which clutch disk is mounted on a transmission shaft in a rotationally fixed manner in the direction of the axis of rotation 7. As in the first embodiment, the spring device 6 is in this case supported in the clutch casing 5 in such a way that the load on the pressure plate 4 is relieved when the diaphragm-spring tips are pressed axially toward the hub 1. In the at-rest position, by contrast, the preloaded spring device presses the friction linings 2 and the flywheel 9 together by means of the pressure plate 4, so that the flywheel 9, which is connected to the crankshaft, and the hub 1 are connected to one another in a rotationally fixed manner by means of frictional engagement between the friction linings 2. In this case, to disengage the clutch, the diaphragm-spring tips are pressed axially toward the hub 1 by means of the disengagement bearing 14. Since the spring device is rotating at the speed of the engine, whereas the disengagement bearing 14 is stationary, friction is generated between the disengagement bearing and the diaphragm-spring tips as soon as the spring device is not secured exactly centrally in the clutch casing 5. Therefore, in this case too, the spring device 6 is preferably provided with a boride coating. The spring device 6 can be produced using the method as described above.

As an alternative to the diaphragm springs shown in the above embodiments, it is also possible to use simple disk spring or coil springs as the spring device. It is also not necessary for said spring device to act on a pressure plate or the like; rather, it can be installed in any spring device which is exposed to temperature fluctuations.

Furthermore, it is clear that the coating method according to the invention and the production method according to the invention can equally well be used for other components made form nickle-base material which are to be coated and/or shaped.

The invention is not limited by the embodiments described above which are presented as examples only but can be modified in various ways within the scope of protection defined by the appended patent claims.

We claim:

1. A friction clutch, for use in the drive train of a motor vehicle, comprising:
   a clutch casing (5); a pressure plate (4) which is guided in a rotationally fixed manner with respect to the clutch casing (5); at least one clutch disk (8) arranged at a side of the pressure plate opposite the clutch casing; and a spring device (6) comprising 40–65% nickel whereby the spring device has a substantially uniform elasticity and strength over an entire operating temperature range of the friction clutch.

2. The friction clutch as claimed in claim 1, wherein said spring device comprises 50–55% nickel.

3. The friction clutch as claimed in claim 1, wherein said spring device (6) additionally contains 10–30% chromium.

4. The friction clutch as claimed in claim 3, wherein said spring device (6) additionally contains 15–25% chromium.

5. The friction clutch as claimed in claim 1, wherein said spring device (6) contains at least one element selected from the group consisting of iron, niobium and molybdenum.

6. The friction clutch as claimed in claim 5, wherein said spring device (6) contains 10–30% iron.

7. The friction clutch as claimed in claim 5, wherein said spring device (6) contains 2–8% niobium.

8. The friction clutch as claimed in claim 5, wherein said spring device (6) contains 1–6% molybdenum.

9. The friction clutch as claimed in claim 1, wherein said spring device (6) contains at least one element selected from the group consisting of aluminum and titanium.

10. The friction clutch as claimed in claim 9, wherein said spring device (6) contains 0.5–5% titanium.

11. The friction clutch as claimed in claim 9, wherein said spring device (6) contains 0.1–5% aluminum.

12. The friction clutch as claimed in claim 1, wherein said spring device (6) comprises at least one coil spring.

13. The friction clutch as claimed in claim 1, wherein said spring device (6) comprises at least one disk spring.

14. The friction clutch as claimed in claim 1, wherein said spring device (6) comprises at least one diaphragm spring.

15. The friction clutch as claimed in claim 1, wherein at least part of the surface of said spring device (6) contains boride.

16. The friction clutch as claimed in claim 15, wherein boride is applied in the molten state to the surface of said spring device (6).

17. The friction clutch as claimed in claim 15, wherein boride is plated onto the surface of said spring device (6).

18. The friction clutch as claimed in claim 15, wherein boride is electroplated onto the surface of said spring device (6).

19. The friction clutch as claimed in claim 1, additionally comprising chromium; and one or more of the elements selected from the group consisting of iron, niobium, molybdenum, aluminum and titanium.

20. The friction clutch as claimed in claim 19, wherein the chromium is present in the amount of 15–25%; the iron in the amount of 10–30%; the niobium in the amount of 2–8%; the molybdenum in the amount of 1–6%; the titanium in the amount of 0.5–5%; and the aluminum in the amount of 0.1–5%.

* * * * *